United States Patent
Tünkers

[19]

[11] Patent Number: 6,102,383
[45] Date of Patent: Aug. 15, 2000

[54] COMBINED CENTERING AND CLAMPING DEVICE FOR USE IN THE AUTOMOTIVE INDUSTRY

[75] Inventor: Josef-Gerhard Tünkers, Ratingen, Germany

[73] Assignee: Tunkers Maschinenbau GmbH, Ratingen, Germany

[21] Appl. No.: 09/176,681

[22] Filed: Oct. 21, 1998

[30] Foreign Application Priority Data

Oct. 21, 1997 [DE] Germany .............................. 297 18 643

[51] Int. Cl.[7] ....................................................... B23Q 3/08
[52] U.S. Cl. ................................. 269/24; 269/32; 269/49; 269/34
[58] Field of Search .................................. 279/2.06, 2.09, 279/133; 269/32, 34, 47, 49, 50, 51, 52, 24

[56] References Cited

U.S. PATENT DOCUMENTS

| | | |
|---|---|---|
| 2,436,941 | 3/1948 | Sendoykas . |
| 3,480,271 | 11/1969 | Coutilish . |
| 3,545,050 | 12/1970 | Blatt et al. . |
| 5,975,605 | 11/1999 | Kot ............................................ 269/32 |

FOREIGN PATENT DOCUMENTS

| | | |
|---|---|---|
| 0 163 219 | 5/1985 | European Pat. Off. . |
| 2 197 701 | 8/1973 | France . |
| 60 527 | 1/1967 | Germany . |
| 1 950 721 | 10/1969 | Germany . |
| 22 22 686 | 5/1972 | Germany . |
| 25 52 441 C2 | 11/1975 | Germany . |
| 78 06 055 | of 1978 | Germany . |
| 32 01 013 C2 | 1/1982 | Germany . |
| 34 19 878 C1 | 5/1984 | Germany . |
| 84 15 338 | 5/1984 | Germany . |
| 35 20 528 C1 | 6/1985 | Germany . |
| 39 36 396 C1 | 11/1989 | Germany . |
| 39 38 208 C1 | 11/1989 | Germany . |
| 29700886 | 3/1997 | Germany . |
| 709285 | 5/1954 | United Kingdom . |
| 778865 | 7/1957 | United Kingdom . |
| 821132 | 9/1959 | United Kingdom . |
| WO 96/35547 | 11/1996 | WIPO . |
| WO 98/28110 | 7/1998 | WIPO . |

OTHER PUBLICATIONS

European Patent Office International Search Report dated Feb. 25, 1999, Application No. 98118859.2–2302.

Primary Examiner—Robert C. Watson
Attorney, Agent, or Firm—Brinks Hofer Gilson & Lione

[57] ABSTRACT

The invention relates to a combined centering and clamping device that is actuatable by a pressure medium, and is especially useful in auto body building industry. Through this invention, large-area clamping of the work product around the circumference of the centering part is possible. This large area clamping produces not only favorable force distribution but also large-area, reliable centering around the centering part, which allows the work product to be locked together with high precision. This invention is especially advantageous in building auto bodies in the automotive industry.

18 Claims, 6 Drawing Sheets

COMBINED CENTERING AND CLAMPING DEVICE FOR USE IN THE AUTOMOTIVE INDUSTRY

BACKGROUND OF THE INVENTION

The invention relates to a combined centering and clamping device actuatable by a pressure medium. In assembling automobiles, sheet-metal parts often have to be welded to body sections. To accomplish this, it is desirable to utilize toggle lever clamping devices that will, for instance, reach through openings in the body parts and firmly clamp the parts and center them in the predetermined position until they are fixed in that position. The parts are then joined together by spot welds or the like.

Toggle lever clamp devices are known in the prior art. One such device is the subject of German Patent No. DE 39 36 396 C1 that discloses a toggle lever clamping device that is actuatable by a pressure medium. The device disclosed in this German patent is intended for use especially for auto body parts, and comprises a single or multi-part housing with a cylinder chamber for the piston and a motion chamber for the piston rod and the toggle lever joint assembly. The device also includes a piston rod guide means on the free end of the piston rod which is disposed in the housing and on a piston rod bolt. The device also includes a tab which is pivotally supported on the piston rod bolt and on a toggle lever joint shaft, and a two-armed lever whose drive end is also supported on the toggle lever joint shaft. The two-armed lever forms a rocker that comprises a bell crank, the apex of which is pivotally supported in the housing, and the power takeoff end is coupled to a clamping member through a pivot shaft. A single-armed rocker, of the same length as the lever arm on the power takeoff side of the two-armed rocker, is pivotally supported in the housing (pivot shaft) and extends parallel to the lever arm of the bell crank on the power takeoff side and is coupled to the clamping member through a pivot shaft. When in the clamping position, the pivot shafts are structurally connected to the housing and the toggle lever joint shaft are located on an imaginary straight line on the drive-side end of the bell crank. The imaginary line extends parallel to the longitudinal axis of the piston rod.

This clamping device is embodied as an undercarriage clamp whose clamping member on the clamping end has a clamping hook that reaches through an opening in the bearing face of the workpiece and whose clamping face is oriented toward the clamping device. A centering mandrel, forming a hollow chamber secured to the housing, is provided which encloses the clamping hook in the unclamped position and allows it to protrude radially in the clamping position.

Another toggle lever clamping device that is actuatable by a pressure medium, and is intended especially for auto body parts, is disclosed in German Patent Disclosure DE 39 38 208. This device comprises a single or multi-part housing with a cylinder chamber for the piston, and a motion chamber for the piston rod and the toggle lever joint assembly. Guide means for the piston rod are provided on the free end of the piston rod, which are guided in guide grooves formed in the housing and in a piston rod bolt. The device includes a tab which is pivotably supported on the piston rod bolt and on a toggle lever joint shaft. There is also a two-armed lever, the drive end of which is supported on the toggle lever joint shaft and its free end acts as a clamping part (clamping hook). There is a pivot bolt braced on the housing and engaging the clamping lever wherein the pivot bolt is guided in a slot of the housing, and a rocker that is pivotally supported in the housing is also supported on the toggle lever joint axis by its other rocker end.

The device includes a pivot bolt that has at least one roller that guides the pivot bolt in a slot that intersects with the longitudinal axis of the piston rod at an acute angle. The device also includes a tab on the toggle lever joint assembly that is pivotally joined to a rocker about a shaft structurally connected to the housing through a toggle lever joint axis extending immovably parallel to the piston rod bolt. The longitudinal pivot axis extends parallel to the piston rod bolt and to the toggle lever joint axis.

OBJECT AND SUMMARY OF THE INVENTION

An object of this invention is to create a combined centering and clamping device that is actuatable by a pressure medium. This invention is intended particularly for building auto bodies. With this invention, metal sheets for auto bodies can not only be reliably centered relative to one another but also clamped with the requisite high contact pressure over a large area located around the centering bolt.

This object is attained by disposing the clamping part directly in and on the centering part. This creates a space-saving construction.

Another advantage of this invention is that, as a result of the clamping part being disposed in and on the centering part, it can be moved out of the centering part only by means of a reciprocating motion of the centering part into the openings in the metal sheets to be centered.

A particularly important advantage of the invention is that, in accordance with the embodiment of the combined centering and clamping device that is actuated by a pressure medium, it is readily possible not only to clamp on one side but also to clamp on multiple sides. This is so since the embodiment, according to the invention, makes it possible to embody the clamping part in multiple parts so that it can be allowed to emerge from the centering part in the same direction synchronously during clamping so that the components to be centered and clamped can be clamped over a large area around the circumference of the centering part. The result is not only a favorable force but also a large clamping area and reliable centering around the centering part so that work components can be locked with high precision. This is especially advantageous in constructing auto bodies in the automotive industry.

In addition, the centering part and clamping part are driven by a pressure medium, such as compressed air, during clamping and also during the release procedure. In some situations, a hydraulic medium may be employed. However, for building auto bodies, compressed air is preferable since compressed air is generally available in the factory and can be utilized for the toggle lever clamping devices.

Another advantageous embodiment of this invention is that the boltlike centering part and the clamping part both use one cylinder that is driven by a pressure medium. As a result, the two cylinders can be disposed coaxially one behind the other. This results in an especially compact construction.

The motion cylinder and the clamping cylinder are advantageously integrally joined to one another. As a result, the parts do not become loose and require service. Moreover, this mode of construction contributes to a further reduction in external structural dimensions.

An especially advantageous embodiment is that the clamping part can include two double levers which can act on diametrically opposed sides of the centering part on the generally flat components to be clamped and retained.

An especially advantageous embodiment is the design of the clamping part which comprises two hook-like double levers which are supported in and on the centering part on one common central shaft. These hook-like toggle levers, in the clamping operation, emerge from the contour of the bolt-like clamping part which is tapered or rounded on its free end. However, the hook-like toggle levers can, on being released, pivot back into the contour, which preferably is an elongated recess in the clamping part. The clamping and centering device can then be removed to allow the work components that were clamped and centered to be removed. Advantageously, the hook-like double levers are joined together in the manner of scissors by a pivot shaft and are coupled by further pivot shafts through levers to a central coupling shaft which is connected to a piston rod. The piston rod is driven by a clamping cylinder which is to be acted upon on both ends in alternation by the pressure medium.

A further advantageous embodiment comprises a device in which the clamping piston carries the piston body of the motion cylinder along with it through a drag coupling in the opening position. This is not done, however, until the clamping piston has moved the clamping device all the way back into the contour of the centering part. Until that time, the motion cylinder is kept locked by the stoppage of pressure medium pressure in that cylinder. Once the clamping device has moved all the way into the contour of the centering part, the drag connection between the clamping piston and the piston body is made so that the centering part is moved through the clamping cylinder to its release position. When this occurs, the toggle levers that are moved all the way into the outer contour of the boltlike clamping part are moved back into the motion cylinder together with the centering part. This course of motion can be controlled by means of follower control.

In an especially advantageous embodiment of the invention, the bolt-like centering part has an oblong slot formed in the remainder of its length, which opens out toward the bottom and on opposite sides toward the outside. In this way, the levers of the clamping part can be disposed in the oblong slot.

The toggle levers are preferably embodied as flat components resting on one another. As a result, on the one hand the bolt-like part need not be so greatly weakened by the oblong slot. On the other hand, this makes it possible, even with relatively shallow levers, to move them outward by pivoting outward with great force on opposed sides onto the work components to be held. Since the stress does not act on the toggle levers orthogonally to their surface, but rather in the direction of the high moment of resistance and moment of inertia of these levers, strong forces can be transmitted.

In another embodiment, the centering part can be joined integrally in terms of material to the piston body which contributes to reducing the number of individual parts.

The embodiment in which the coupling shaft is guided in lengthwise slots that prevents relative rotation while the pivot shafts, as well as the ends of levers, can enter into widened portions of the motion cylinder is an important improvement of this invention.

Another important embodiment uses only one clamping hook. In this embodiment, the reaction forces are absorbed by the roller guide in the housing.

BRIEF DESCRIPTION OF THE DRAWINGS

In the drawing, the invention is shown by way of example and partly schematically.

DESCRIPTION OF THE PREFERRED EMBODIMENTS

Figure 1:
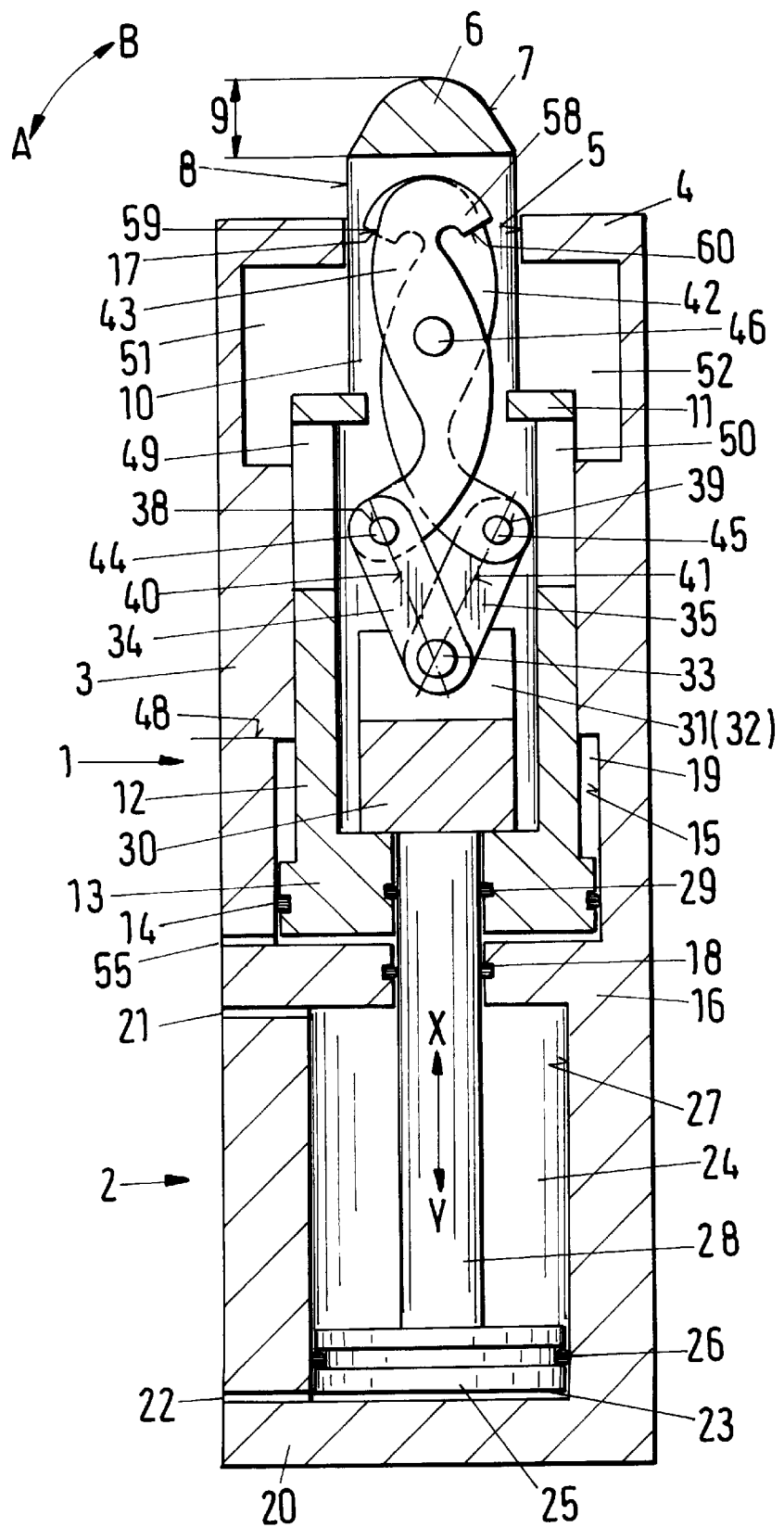
FIG. 1 is an axial longitudinal section view, partly in an elevation view, showing a combined centering and clamping device of the invention, actuatable by pressure medium, in the released position, that is, the zero position of the centering and clamping device.

The invention that includes a combined centering and clamping device that is actuatable by the application of pressure has been illustrated in terms of an embodiment that is especially advantageous in the automotive industry.

The device of the invention substantially comprises two coaxial cylinder units that are disposed one behind the other, one of which is embodied as a motion cylinder 1 and the other of which is embodied as a clamping cylinder 2. In the present embodiment, the two cylinders 1, 2 are embodied integrally. However, cylinders that are not physically integral but function integrally with one another can also be used. For example, the cylinders could be connected by screws and, accordingly, could be released from one another.

The motion cylinder 1 is composed of an outer cylinder 3 with a cylinder cap 4 on its face end. The cap can be retained by a plurality of screws (not shown). The screws are screwed into threaded blind bores in the cylinder 3 and are distributed uniformly over the circumference of the cylinder 3. The screws are also disposed in countersunk bores of the cylinder cap 4 so that the screw heads are countersunk.

The cylinder cap 4 has a central opening 5 for the passage through of a bolt-like centering part 6. The free end portion of centering part 6 has a rounded or conical shaped outer jacket face 7. The rounded or conical shaped jacket face 7 permits it to better move into recesses in flat work components, such as sheet-metal auto body parts. The lengthwise portion 8 of bolt part 6 that adjoins the conical or rounded end portion 7 is embodied essentially as a hollow bolt that has a slit-like oblong slot 10. The slot 10 extends along the interior of the lengthwise portion 8 and opens in the transverse sides thereof. The slot 10 extends downwardly for the remaining length of centering part 6.

Figure 5:
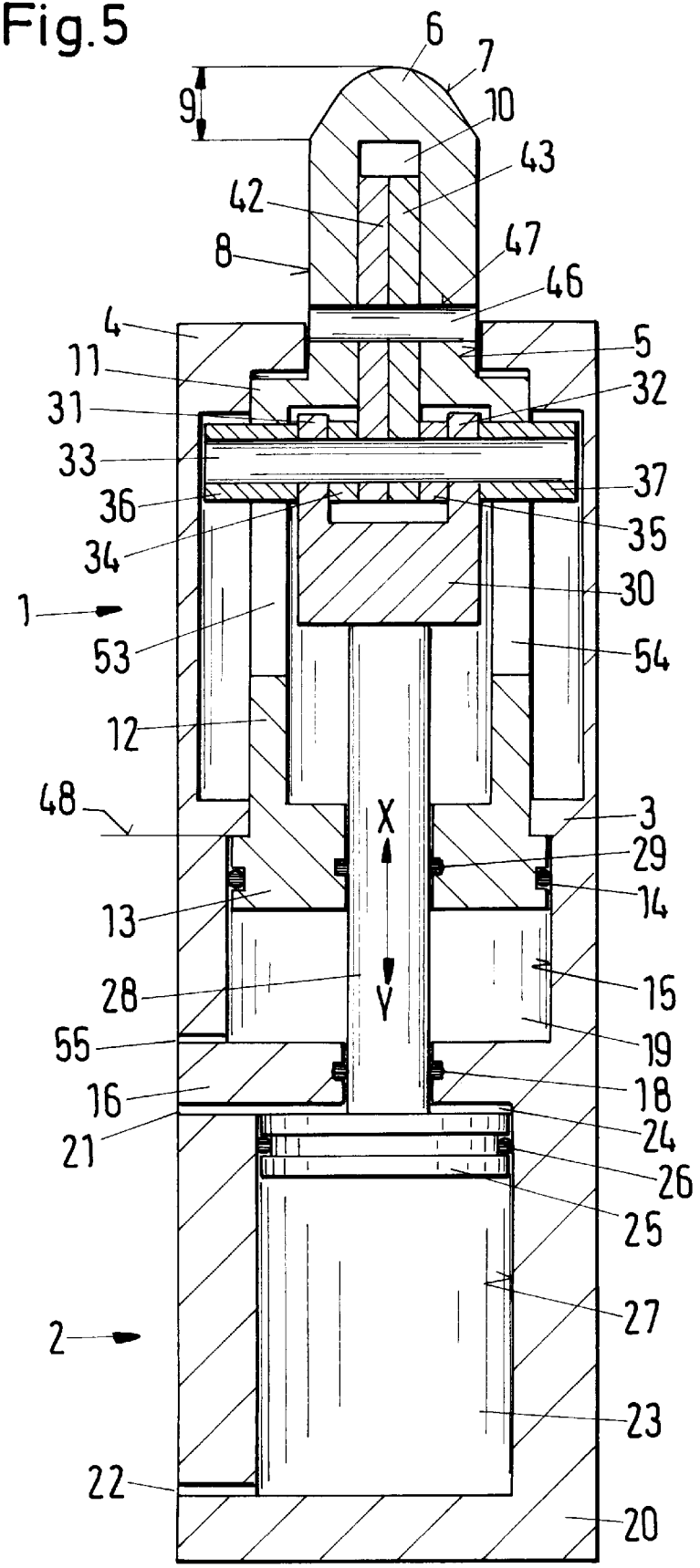
FIG. 5 is an axial longitudinal section view offset by 90° from FIG. 1.

As can be seen from FIG. 5, the centering part 6 is joined by a flange 11 to the cylindrical piston body 12 which, at its lower end, is integrally joined to a motion piston 13. The motion piston 13 is longitudinally displaceable along the inner cylindrical wall 15 of the outer cylinder 3. Motion piston 13 is sealed by a seal 14. The flange 11 forms part of the piston body 12.

On the end opposite the cylinder cap 4, the motion cylinder 1 is closed by an end cap 16 which, in this embodiment, is integral with motion cylinder 1 but which may also be a separate component that is sealed off tightly by seals with the motion cylinder 1. The end cap 16 is then braced by an annular shoulder on the face end of the cylinder 3 and the remainder of its lengthwise portion engages the cylinder chamber 19. In this region, it is tightly sealed off by the seal against the pressure medium. Another seal presses against the face end of the cylinder 3 such that it is tight against the pressure medium.

The end cap 16 may also be retained by an annular flange of the clamping cylinder 2 by means of a turned or machined annular shoulder so that the end cap 16 is locked axially and radially in form-locking fashion. The seal is disposed in an annular groove of the annular flange.

On the end portion of the clamping cylinder 2 opposite the end cap 16, an end cap 20 is disposed in a manner tight against pressure medium. This end cap 20, although illustrated as being integral with clamping cylinder 2, may be joined as a separable component held by screws to the cylinder body of the clamping cylinder 2.

Conduits for supplying pressure medium are connected to clamping cylinder 2 at 21 and 22. The pressure medium is discharged into cylinder chambers 23 and 24 which are defined in varying size by a clamping piston 25. Clamping piston 25 moves longitudinally along the inner cylindrical wall 27 of the clamping cylinder 2 and is guided by at least one sealing element 26

The clamping piston 25 has a bore for instance centrally provided with a thread (not shown) in which a threaded end portion of a piston rod 28 is secured. Piston rod 28 extends longitudinally through and is displaceable relative to end cap 16. Piston rod 28 is sealed relative to end cap 16 by a seal 18.

The end cap 16 may also be embodied as a separate component from the cylinder 3 of the motion cylinder 1 and can be joined to motion cylinder 1 by screws, clamps, or the like.

On its upper end, the piston rod 28 is coupled to a coupling 30 for instance by threads or the like. Coupling 30 is provided with integral bearing flanges 31 and 32 in the form of a bearing fork. In the longitudinal section view of FIG. 5, bearing flanges 31 and 32 together with the crosspiece joining them form a U. The bearing flanges 31 and 32 have coaxial bores, through which a coupling shaft 33 passes. Two tab-like levers 34 and 35 are pivotally disposed on coupling shaft 33 such that they can pivot parallel to one another. To that end, the tab-like levers 34 and 35 each have through bores penetrating them, through which the coupling shaft 33 extends. The coupling shaft 33 is prevented from axial movement by Seeger rings or tubes 36, 37 that are secured to the shaft ends and which bear against the bearing flanges 31 and 32.

The ends of each tab-like lever 34, 35 have a respective bore 38 and 39, whose centerpoint is located on a respective center line 40 and 41, which also passes rectilinearly through the centerpoint of the coupling shaft 33. Each of the bores 38 and 39 is disposed coaxially to a further bore (not specifically shown), which is disposed on the lower end region (in terms of the plane of the drawing) of each of two respective clamping hooks 42 and 43. Pivot shafts 44 and 45 extends through the respective bores 38 and 39 and the corresponding bores in the respective clamping hook 42 and 43. The pivot shafts 44 and 45 extend with their longitudinal axes parallel to the longitudinal axis of the coupling shaft 33, so that the clamping hooks 42 and 43 also pivot in planes parallel to the plane in which tablike levers 34 and 35 pivot. In other words, clamping hooks 42 and 43 move in the directions A and B, respectively.

The clamping hooks 42 and 43 form the clamping part of the device.

The clamping hooks 42 and 43, embodied as a double lever, are pivotally coupled to one another by a bearing shaft 46 at approximately their middle longitudinal region. Bearing shaft 46 is supported in a bore 47 formed in the centering part 6, specifically in the walls of the tubular portion of the centering part 6 (see FIG. 5). The longitudinal axis of the bearing shaft 46 likewise extends parallel to the coupling shaft 33 and, thus, also parallel to the longitudinal axes of the pivot shafts 44 and 45.

The central opening 5 of the face-end cylinder cap 4 can be engaged by a flange with an annular collar that is disposed above the orifices of the bore 47. Such a flange would be secured by a plurality of screws distributed over its circumference.

The piston body 12 of the motion cylinder 1 can also be embodied as closed at its end portion remote from the clamping hooks 42, 43 by a cap that is connected by screws as a separate part into the face end of the piston body 12 and sealed off by a seal. Such an embodiment differs from the illustrated embodiment where such a cap is integral with the piston body 12.

The piston rod 28 can extend through the cap containing a seal in a manner to provide a seal for the pressure medium. In another embodiment, the coupling 30 is joined via threads to the piston rod 28, while in the illustrated embodiment it is integral with the piston rod 28.

An annular stop shoulder is disposed at 48 in the cylinder 3. However, in another embodiment, the stop shoulder 48 may be disposed on a stop sleeve that is secured to the inner wall of the outer cylinder 3.

Figure 2:
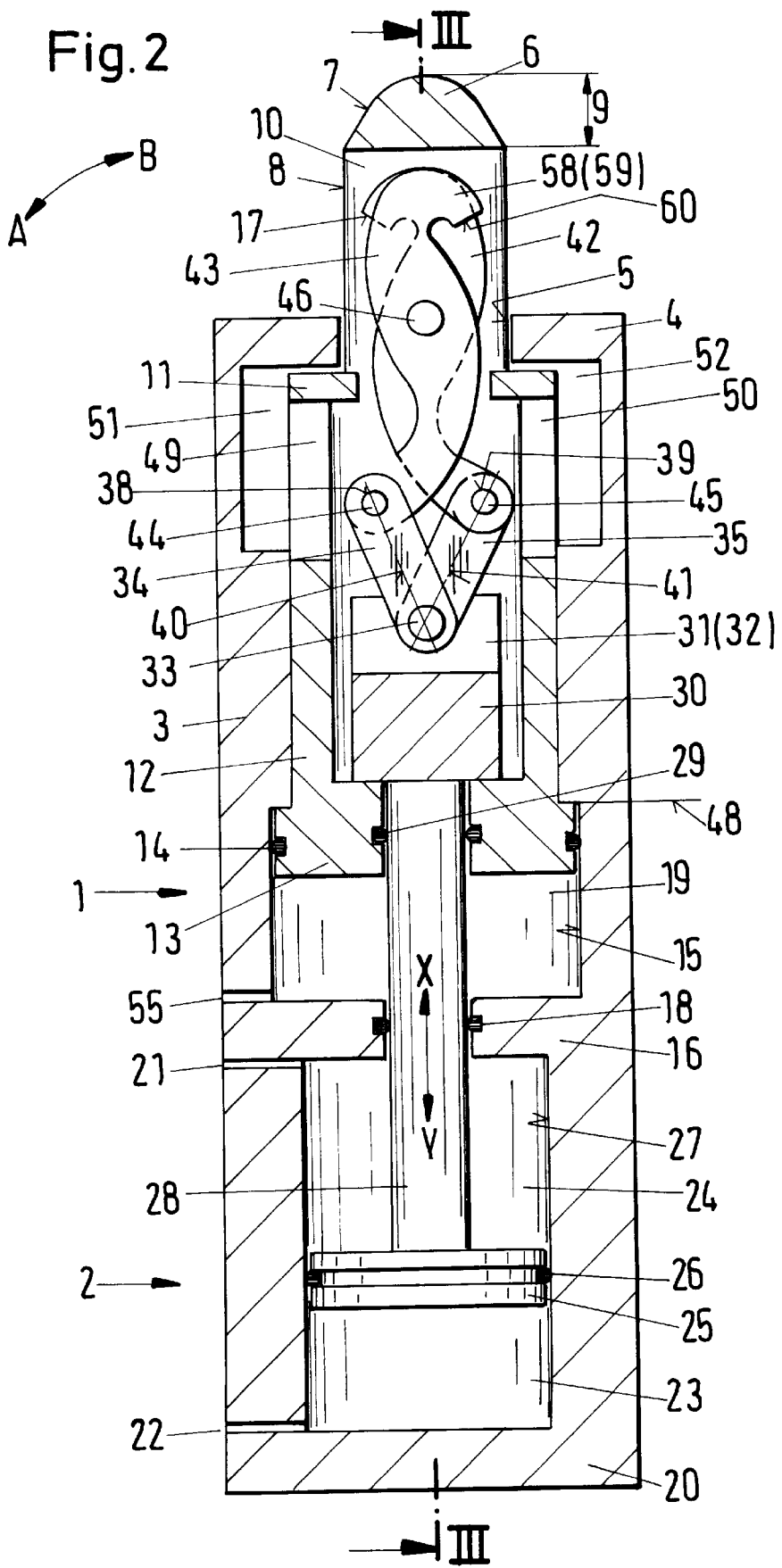
FIG. 2 shows the device of FIG. 1 after the centering part has moved outward.
Figure 3:
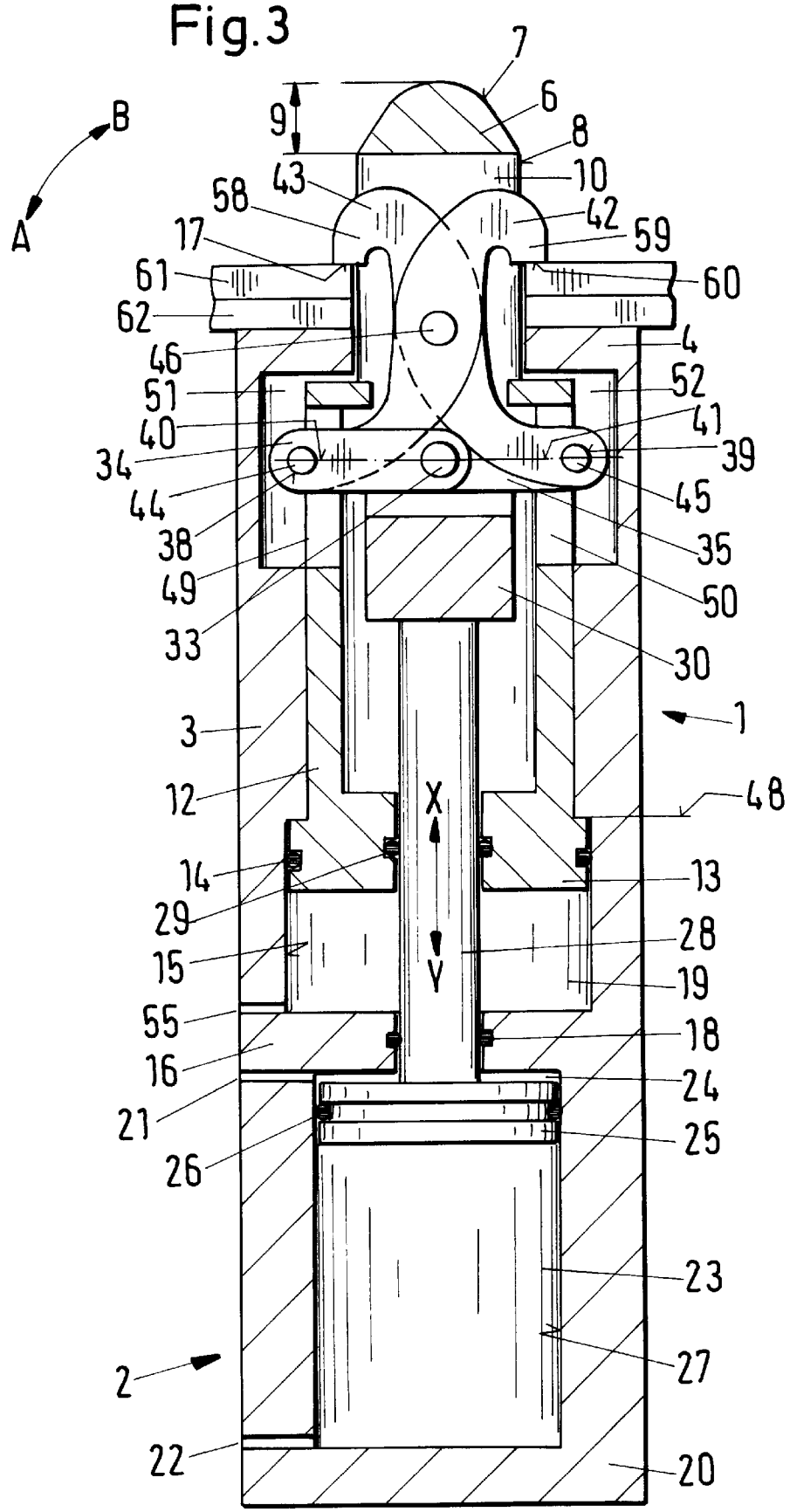
FIG. 3 shows the device of FIGS. 1 and 2 after the clamping part has moved outward, in a longitudinal section taken along the line III—III of FIG. 2.
Figure 4:
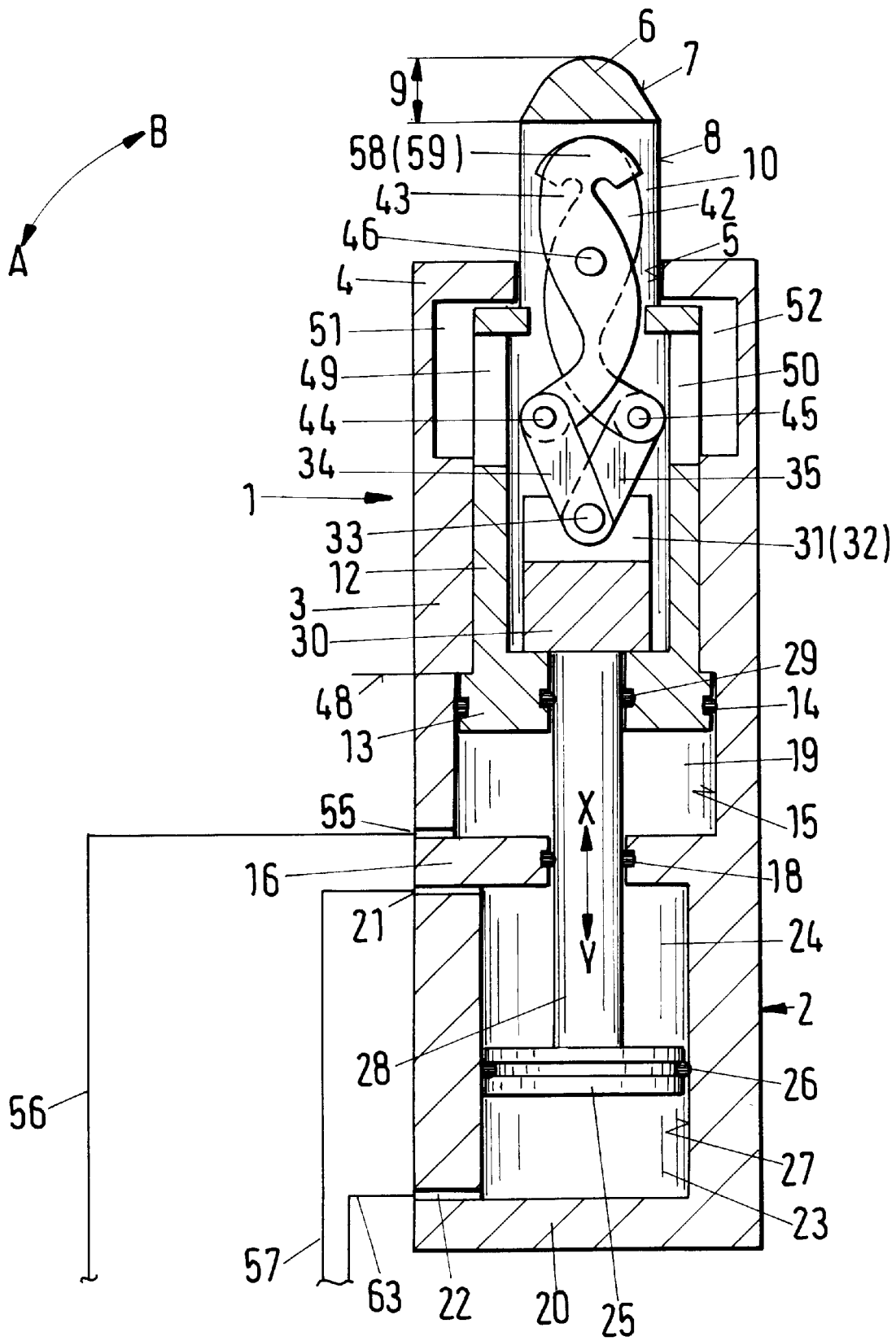
FIG. 4 is partly in the form of a circuit diagram, showing the device of FIGS. 1–3 as the clamping and centering device is being moved inward.

As is best seen in FIGS. 1–3, the piston body 12 on its end portion toward the clamping hooks 42, 43 is provided with recesses 49 and 50 on diametrically opposed sides through which recesses both end portions of the clamping hooks 42 and 43 and the pivot shafts 44 and 45, together with end portions of the tablike levers 34 and 35, can each enter a respective widened portion 51 and 52 of the motion cylinder 1 (clamping position shown in FIG. 3).

As best seen in FIG. 5, the ends of the coupling shaft 33 are guided in the longitudinal direction in a manner to secure against relative rotation by the tubes 36 and 37. In another embodiment, the tubes are embodied as rollers that are engaged in the corresponding lengthwise slits 53, 54 of the piston body 12 and of the outer cylinder 3 surrounding it.

Reference numeral 55 indicates a connection for a conduit that may optionally be threaded.

Reference numerals 56 and 57 designate conduits or lines for the pressure medium, which via a control unit, such as a multi-way valve, are connected to a pressure medium supply. The pressure medium supply provides the medium under pressure (hydraulically or pneumatically) via a motor-driven pump or the like.

There is shown in FIG. 3 two clamping hooks 42 and 43 that are embodied so as to extend along a circular arc on their side walls facing one another while their backs remote from one another are rounded along a plurality of circular arcs and curves. Clamping heads 58 and 59 are provided in hooklike fashion with downward-pointing clamping claws 17 and 60 which act directly on the flat components 61 and 62, respectively, and firmly fasten and hold them to the top side of a support member.

As can be seen, the clamping hooks 42 and 43 protrude out of the centering part 6 exposing their clamping claws 17 and 60.

It can also be seen that the motion cylinder 1 and the clamping cylinder 2 are disposed structurally, physically integrally and coaxially to one another in such a way as to result in a very compact construction.

The mode of operation of the embodiment shown in the drawing is as follows:

In the outset position of FIG. 1, via the applicable control unit, the line 56 and the conduit connection 55, the cylinder chamber 19 is acted upon by the pressure medium, such as compressed air, causing the piston body 12 of the motion cylinder 1 to move in the direction X. Since the centering part 6 is integrally joined to the piston body 12, it is likewise moved in the direction X, that is, out of the device (FIG. 2), and thereby centers the flat work components, such as sheet-metal body panels 61, 62, disposed on the device.

The clamping cylinder 2 has not yet been actuated at this time.

Once the position shown in FIG. 2 is reached, then via the control unit and the line 63 and the conduit connection 22, the cylinder chamber 23 of the clamping cylinder 2 is acted upon by the pressure medium, causing the clamping piston 25 and with it the piston rod 28 to move in the direction X and also via the coupling 30 to carry the tab-like levers 34 and 35 along via the coupling shaft 33. In this process, the tab-like levers 34 and 35 pivot away from one another about the coupling shaft 33. At the same time, the double-lever clamping hooks 42 and 43 gradually pivot out from their position seen in FIG. 2 into their position seen in FIG. 3, which is their clamping position. In this process, they emerge from the outer boundary of the bolt-like centering part 6 into the position shown in FIG. 3 and clamp the flat work components 61, 62, centered by the centering part 6, on diametrically opposed sides firmly, close to the centering part 6, against the top side of the cylinder cap 4 or against a flange disposed at this location. They are held in this position as long as pressure medium is allowed to act on the underside of the clamping piston 25.

The inward motion is accomplished by action on the upper or annular side of the clamping piston 25, that is, via the control unit, the line 57 and the conduit connection 21, as well as the cylinder chamber 24. As a result, the clamping piston 25 moves in the direction Y and, via the coupling 30, also carries the coupling shaft 33 and the tab-like levers 34 and 35 along with it. The clamping hooks 42 and 43 in this process are pivoted back via their pivot shafts 44 and 45 into the position shown in FIGS. 1 and 2 until they are inside the oblong slot 10 of the centering part 6. The piston body 12 of the motion cylinder 1 is retained during this process as a result of action by the pressure medium via the conduit connection 55. During the inward motion of the clamping hooks 42 and 43, the piston body 12 of the motion cylinder 1 must initially remain in its centering position.

Once the clamping piston 25 of the clamping cylinder 2, as a result of motion in the direction Y, has been moved back into its zero position, or nearly to it, the cylinder side of the piston body 12 for the centering part 6 is pressure-relieved and the piston body 12 of the motion cylinder 1 is moved by the clamping piston 25 in the direction Y. This is in the manner of a drag connection by means of the coupling 30 moving until it reaches its outset position shown in FIG. 1.

Figure 6:
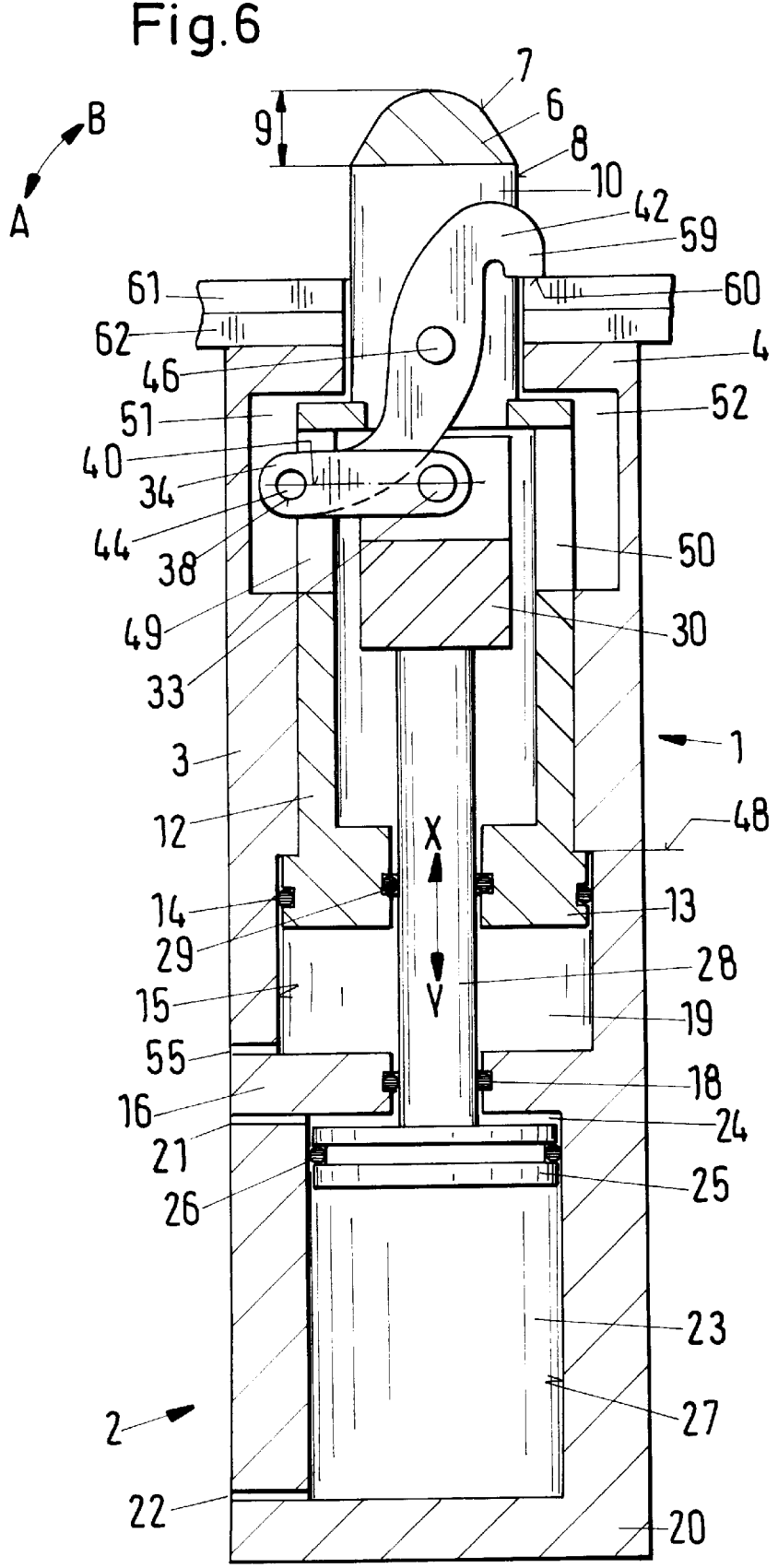
FIG. 6 is a longitudinal section view partly in cutaway fashion showing a further embodiment of the invention.

There is shown in FIG. 6 a further embodiment of the invention in which the same reference numerals as in the previous embodiments are used for parts having the same function.

The embodiment of FIG. 6 differs from the embodiments described above in that, instead of two clamping hooks, only one clamping hook 42 is provided. The drive and the remaining mode of operation is as already explained in conjunction with the previous embodiments. This is particularly true for the expanded portion 51, 52 and for the axial guidance by the coupling shaft 33 with tubes or rollers 36 so that the reaction forces can again be absorbed thereby.

The characteristics described in the abstract, claims and specification, and as shown in the drawings, can be essential to the realization of the invention both individually and in any arbitrary combinations.

What is claimed is:

1. A combined centering and clamping device actuatable by pressure medium, especially for use in auto body building in the automotive industry, including a bolt-like centering part (6) and a clamping part (42, 43), said bolt-like centering part (6) includes a pressure medium-driven motion cylinder (1) with a piston body (12), and the clamping part (42, 43) includes a clamping cylinder (2) with a clamping piston (25), and said motion cylinder (1) and said clamping cylinder (2) being disposed coaxially in line with one another, and wherein the clamping part (42, 43) is supported in a slot formed in said bolt-like centering part (6) and the centering part (6) and the clamping part (42, 43) are driven one after the other in alternation in both directions, to clamp and center or release in response to the application of pressure by said pressure medium.

2. The combined centering and clamping device actuatable by pressure medium as recited in claim 1, wherein the invention further comprises:

said motion cylinder (1) and said clamping cylinder (2) being integrally joined in terms of material or functionally with one another.

3. The combined centering and clamping device actuatable by pressure medium as recited in claims 1 or 2, wherein the invention further comprises said clamping part (42, 43) comprising two double levers which are pivotably supported in their middle longitudinal region about a common bearing shaft (46) in the bolt-like centering part (6).

4. The combined centering and clamping device actuatable by pressure medium as recited in claim 3, wherein the invention further comprises each double lever of said clamping part (42, 43), on its end remote from the free end of the bolt-like centering part (6), has a respective bore through each of which bores a respective pivot shaft (44, 45) extends, and that one tab-like lever (34 and 35) is supported on each pivot shaft (44 and 45, respectively), and each said lever (34, 35) on its other end has a respective bore, and that both tab-like levers (34, 35) are pivotably supported on a common coupling shaft (33), and said coupling shaft (33) is supported in a coupling (30) which can be driven via a piston rod (28), which is connected to the clamping piston (25) that in turn is longitudinally displaceably and sealingly guided in said clamping cylinder (2).

5. The combined centering and clamping device actuatable by pressure medium as recited in claim 4, wherein the invention further comprises the piston rod (28) of said clamping cylinder (2) protrudes into the piston body (12) in a manner sealed off by one face end of a piston body (12) of the motion cylinder (1), and said clamping piston (25) functions to actuated in a controlled fashion with pressure medium pressure in alternation on both sides, each via a respective conduit connection (21 and 22, respectively).

6. The combined centering and clamping device actuatable by pressure medium as recited in claim 5, wherein the invention further comprises: the piston body (12) of said motion cylinder (1) being guided longitudinally, displaceable and sealed by means of a motion piston (13) along an inner wall (15) of said motion cylinder (1), and the axial displacement path being defined on one side by an end cap (16) being oriented toward the clamping cylinder (2) and on the face end by a stop, structurally connected to the housing, of said motion cylinder (1), and a conduit connection (55) discharges below the motion piston (13) into a cylinder chamber (19) of said motion cylinder (1), through which pressure medium pressure can be delivered in controlled fashion below the motion piston (13).

7. The combined centering and clamping device actuatable by pressure medium as recited in claim 4, wherein the invention further comprises: the clamping piston (25) is coupled by a drag connection to the motion piston (13) of the motion cylinder (1) through the piston rod (28) and the coupling (30) when an opening stroke (Y) is performed.

8. The combined centering and clamping device actuatable by pressure medium as recited in claim 1, and wherein the invention further comprises: said centering part (6) can be locked in the centering position through the motion cylinder (1) during the release stroke of the clamping cylinder (2), by stopping pressure medium pressure below the motion piston (13) until such time as the clamping device (42, 43) has moved all the way into said slot formed in the centering part (6), whereupon the drag connection of the clamping piston (25) with the piston body (12) can be made in order to move the centering part (6) back into the release position.

9. The combined centering and clamping device actuatable by pressure medium as recited in claim 3 and wherein the invention further comprises: the clamping levers (42, 43) of said clamping device are rounded in accordance with curves on their backs remote from one another, while on their side walls oriented toward one another they extend along circular arcs, and the outer ends of the clamping levers (42, 43) are each provided with a respective clamping head (58, 59), which are provided with clamping claws (17, 60) on their surface regions oriented toward the flat component (61, 62) to be retained.

10. The combined centering and clamping device actuatable by pressure medium as recited in claim 3 and wherein the invention further comprises: the bolt-like centering part (6) is pierced by an oblong slot (10) over the predominant portion of its length, said slot opens out toward the bottom and on opposite sides toward the outside, and the clamping levers (42, 43) are disposed with the bearing shaft (46) in said oblong slot (10) in such a way that the bearing shaft (46) is disposed in a bore (47).

11. The combined centering and clamping device actuatable by pressure medium as recited in claim 3 and wherein the invention further comprises: the clamping levers (42, 43) being embodied as flat components resting on one another, which on both end portions are each provided with recesses pointing away from one another, and the outer ends of the clamping levers have the clamping claws (59, 60) which each cooperate with one flange on which the respective component (61, 62) rests.

12. The combined centering and clamping device actuatable by pressure medium as recited in claim 4 and wherein the invention further comprises: the tab-like levers (34, 35) in the release position of the device with their longitudinal axes each forming an acute angle with the common longitudinal axis of the motion cylinder (1) and the clamping cylinder (2), and thus form such an angle with respect to the piston rod (28) as well.

13. The combined centering and clamping device actuatable by pressure medium as recited in claim 5 and wherein the invention further comprises: the piston rod (28), on its end toward the coupling (30), is provided with a threaded portion by way of which the piston rod (28) can be releasably coupled to the coupling (30).

14. The combined centering and clamping device actuatable by pressure medium as recited in claim 5 and wherein the invention further comprises: the centering part (6) is joined integrally in terms of material with the piston body (12).

15. The combined centering and clamping device actuatable by pressure medium as recited in claim 5 and wherein the invention further comprises: the centering part (6) immediately below the cylinder cap (4) on the face end has a flange (11) through which the clamping levers (42, 43) extend and below which the pivot shafts (44 and 45, respectively), for the tab-like levers (34, 35) are disposed.

16. The combined centering and clamping device actuatable by pressure medium as recited in claim 15 and wherein the invention further comprises: below said flange (11), the piston body (12) is provided on diametrically opposed sides with axially extending recesses, through which the clamping levers (42, 43) pass with their pivot shafts (44, 45) in the pivoting operation, and in this region the motion cylinder (1) is likewise provided, on each of diametrically opposed sides, with a respective lengthwise slot (53, 54), into which the coupling shaft (33) protrudes and in which it is guided.

17. The combined centering and clamping device actuatable by pressure medium as recited in claim 16 and wherein the invention further comprises: the coupling shaft being guided and supported in said lengthwise slots (53, 54) by tubes or rollers (36, 37).

18. The combined centering and clamping device actuatable by pressure medium as recited in claim 1 and wherein the invention further comprises: a single clamping part (42), including a clamping hook, is provided.

* * * * *